United States Patent

[11] 3,616,076

| [72] | Inventor | Johannes M. Gepkens<br>5240 S. 9th East, Murray, Utah 84107 |
|---|---|---|
| [21] | Appl. No. | 805,451 |
| [22] | Filed | Mar. 10, 1969 |
| [45] | Patented | Oct. 26, 1971<br>Continuation-in-part of application Ser. No. 564,393, July 11, 1966. |

[54] FORMING APPARATUS
8 Claims, 10 Drawing Figs.

[52] U.S. Cl..................................................... 156/479,
156/216, 156/583
[51] Int. Cl............................................................ B32b 3/04
[50] Field of Search........................................... 156/216,
477, 479, 583

[56] References Cited
UNITED STATES PATENTS
| 2,937,689 | 5/1960 | Peterson...................... | 156/216 |
| 3,147,172 | 9/1964 | Wesa et al. ..................... | 156/479 X |
| 3,296,052 | 1/1967 | Bechtold ...................... | 156/477 X |
| 3,392,074 | 7/1968 | Bartron ....................... | 156/216 |

*Primary Examiner*—Samuel W. Engle
*Attorney*—C. Harvey Gold

ABSTRACT: A device for fabricating laminated plastic surface objects which includes a support frame; a bed attached to the frame; a platen mounted above the bed for holding a sheet of laminated plastic material in a fixed position on the bed; an elongated die connected to the frame proximate to and along one side edge of the bed; and pressure means for bending the plastic material over the one side edge of the bed and urging said material into the die. Second pressure means can be connected to the frame for bending the opposite edge of the plastic material around a sculptured counter top blank and heaters can be connected to the frame for heating the plastic material to its softening temperature.

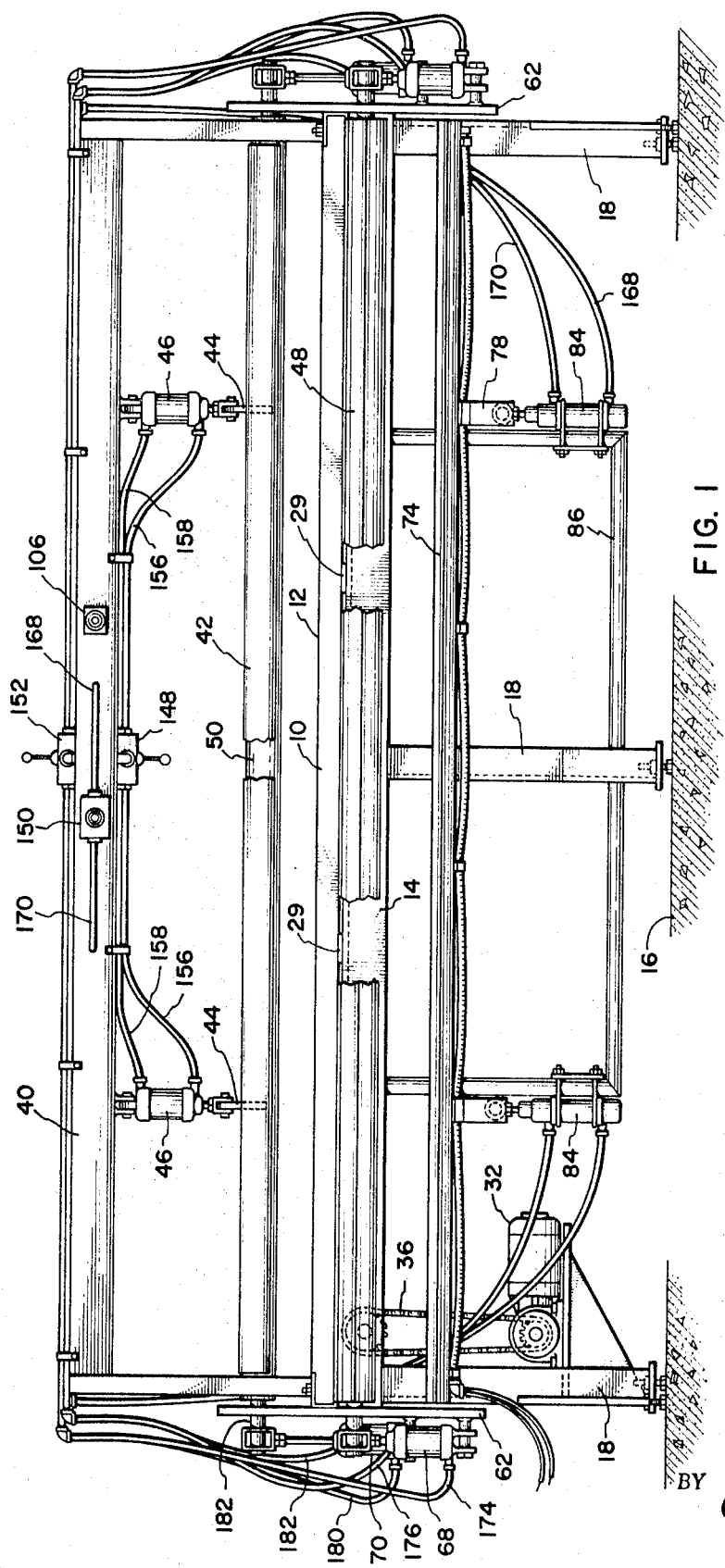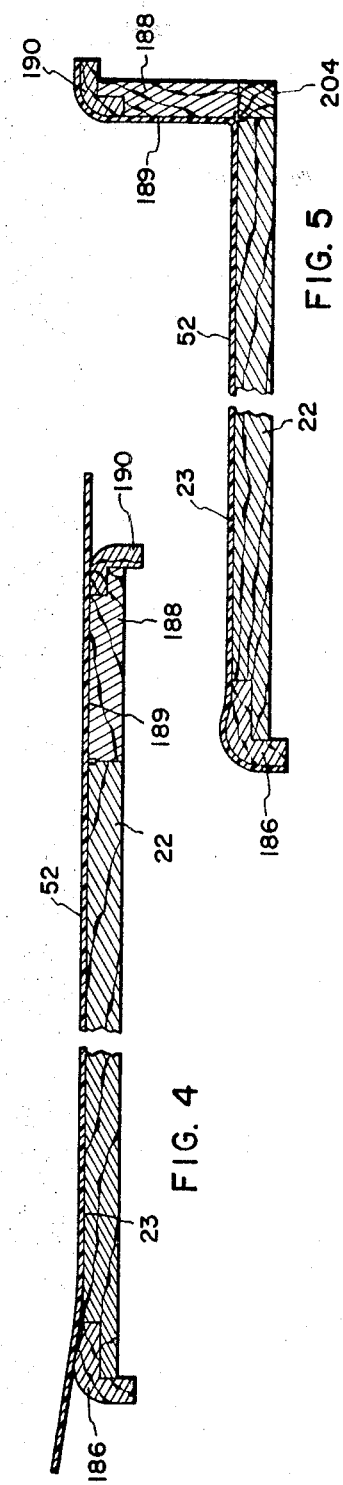

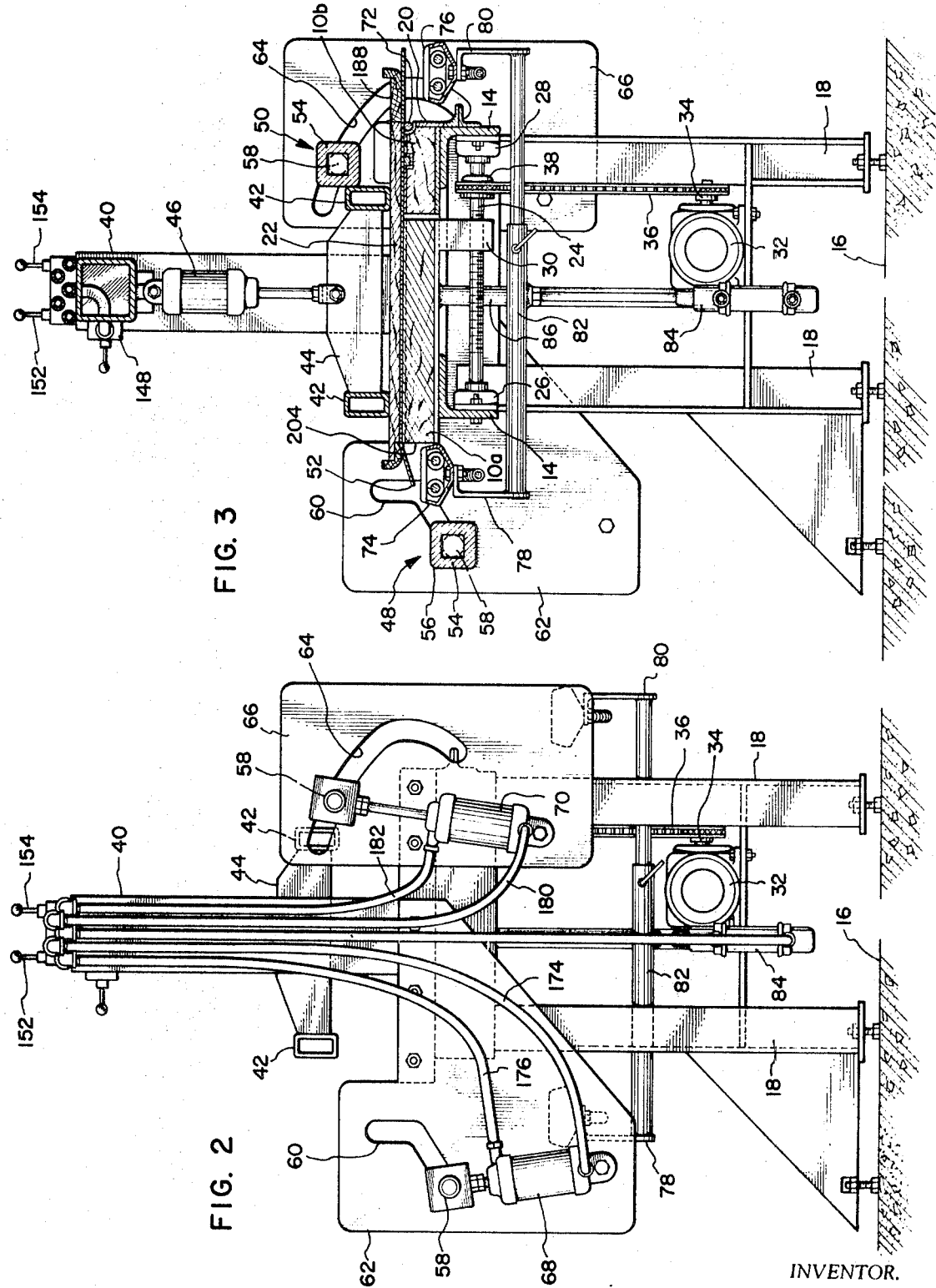

*INVENTOR.*
JOHANNES M. GEPKENS
BY
*ATTORNEY*

FORMING APPARATUS

CROSS REFERENCE TO RELATED APPLICATION

This is a continuation-in-part of my copending U.S. Pat. application Ser. No. 564,393, filed July 11, 1966, and entitled Improvements In Laminated Constructions.

BACKGROUND OF THE INVENTION

This invention relates to an improved device for fabricating laminated plastics into counter tops and the like.

The use of laminated plastics for covering the tops of sinks, bars, and similar surfaces has become very popular in recent years. When used for this purpose, the plastics generally must be sharply bent to provide a substantially vertical splash board with a rounded top edge and a downwardly projecting outer rim. In my herein-identified copending U.S. Pat. application a device is described for fabricating such laminated plastic covered members which includes a heating means for softening the plastic and means for bending it. While this device has proven to be entirely suited for its intended purpose, like other similar devices, it cannot be used to form a counter top with a downwardly projecting front rim, a vertical splash board and a substantially horizontal top rim in a single operation. Accordingly, a great need has arisen for an apparatus which can precisely form such tops in one operation.

SUMMARY OF THE INVENTION

This invention relates to an improved apparatus for fabricating laminated plastic surface objects.

In its broadest form the invention comprises a support frame; bed means having opposite spaced side edges attached to the frame for supporting a sheet of moldable material; platen means attached to said support frame for holding the sheet of formable material in a fixed position against the bed means; elongated die means affixed to the support frame in a position proximate to and along one of the side edges of said bed means for shaping said moldable material when said material is urged against said die means; and pressure means connected to the frame for bending said moldable material over said one side edge of said bed means and urging the moldable material against said die means.

In another embodiment of the invention the moldable material is a laminated plastic and heaters are attached to the frame for heating the plastic so that it is easily bent around the bed's first side edge and into the die means.

In still another embodiment of the invention the plastic material is bonded on its back side to a support blank and means are provided for bending the plastic material around sculptured portions of the support blank.

BRIEF DESCRIPTION OF THE DRAWINGS

So that the invention may be more readily understood and carried into effect, reference is made to the accompanying drawings which are offered by way of example only and are not to be taken as limiting the invention, the scope of which is defined by the claims which are intended to embrace equivalent structures.

FIG. 1 is a plan elevation view of the molding apparatus of this invention which for purposes of clarity is shown partially broken away.

FIG. 2 is an end view of the molding apparatus.

FIG. 3 is a transverse sectional view of the molding apparatus with the apparatus platen shown in its lowered position and its side heaters elevated.

FIG. 4 is an end view of a counter top blank of a type suited for use with the molding apparatus of this invention.

FIG. 5 is an end view of a finished counter top formed with the molding apparatus of this invention.

DESCRIPTION OF THE PREFERRED EMBODIMENT

Figures 6, 7:
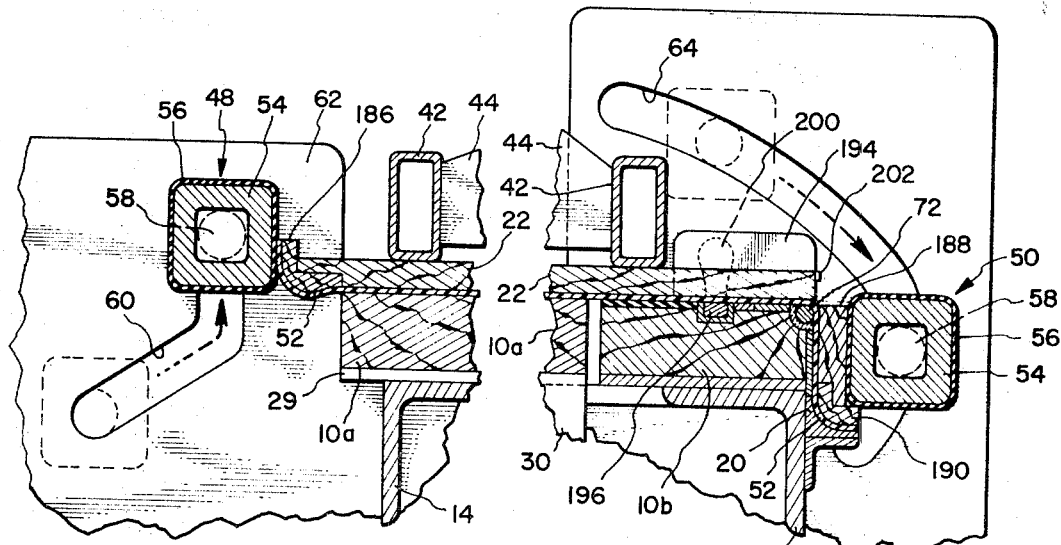
FIG. 6 is a partial sectional view of the pressure means used to mold the laminated plastic around the front bull nose edge of the counter top blank.
FIG. 7 is a partial sectional view of the elongated splash board die and the pressure means for urging the laminated plastic around the side edge of the bed and into the die.

Referring now more particularly to the drawings, the fabricating device of this invention includes an elongated bed 10 having substantially plane top face 12 affixed to a support frame 14 which is held above floor level 16 with spaced legs 18. Forming die 20 is attached to frame 14 along one longitudinal side edge of bed 10 for shaping laminated plastic urged into the die as hereinafter described. Preferably bed 10 is formed with at least two sections 10a and 10b so that its width can be varied to accommodate different sized counter top blanks 22. The bed sections can be interconnected together with screw members 24 journaled at their opposite ends to connectors 26 and 28 which in turn are fixedly attached to support frame 14. Members 24 are screwed into threaded brackets 30 secured to bed section 10a so that when the screw 24 is rotated bracket 30 is moved along the screw to thereby move section 10b on support tracks 29 which are affixed to frame 14. Screw member 24 can be power operated with a motor 32 which drives sprocket 34 and coacting chain 36 mounted on a sprocket 38 keyed to the screw member.

Overhead frame 40 is attached to support frame 14 to extend upwardly over the top face 12 of bed 10 for supporting a platen above the bed. The platen includes spaced pressure bars 42 connected together with spacers 44. The spacers are pivotally connected to one end of elevating and lowering means such as double-acting hydraulic pistons 46 which are in turn connected at their opposite ends to the overhead frame 40.

Forming bars 48 and 50 are supported at their opposite ends in guide slots so that they coact in a programmed fashion with the opposite sides of blank 22 to thereby mold laminated plastic sheet 52 over the curved portions of the blank and bend the sheet over the side edge of bed 10 as hereinafter described. Each of the bars 48 and 50 comprise a substantially square elongated tubular member 54 covered with a resilient material such as rubber coating 56 which minimizes scoring when the bars contact the plastic sheet. Tubular members 54 are rotatably mounted on support shafts 58 which are mounted at their opposite ends in the guide slots, i.e., support shaft 58 of bar 48 is mounted at its opposite ends in guide slots 60 formed in guide plate 62 and support shaft 58 of bar 50 is mounted at its opposite ends in guide slots 64 formed in guide plates 66. Guide plates 62 are affixed to the opposite ends of support frame 14 proximate one side of bed 10 and guide plate 66 are affixed to the opposite side of the frame proximate the bed's other side edge. Double-acting hydraulic pistons 68, journaled at one end to guide plates 62 and at their other end to support shaft 58 of forming bar 48, and double acting hydraulic pistons 70, journaled at one end to guide plates 66 and at their other end to support shaft 58 of forming bar 50, urged bars 48 and 50 to move along the guide slots 60 and 64 respectively and coact with blank 22.

Before most conventional laminated plastics can be bent the plastic must be heated to a predetermined softening temperature. Accordingly, the fabricating device of this invention is provided with suitable heating means. Rod heater 72 is positioned along the side edge of bed 10 proximate the intersection between said bed and forming die 20. In addition, heaters 74 and 76, mounted on brackets 78 and 80 and adjustable bars 82, are positioned on the opposite sides of bed 10 to heat the portions of laminated plastic sheet 52 which extends outwardly over the side edges of said bed. Adjustable bars 82 are secured to double-acting hydraulic pistons 84 which are in turn attached below bed 10 to bracket 86 and frame 14.

Figures 8, 9:
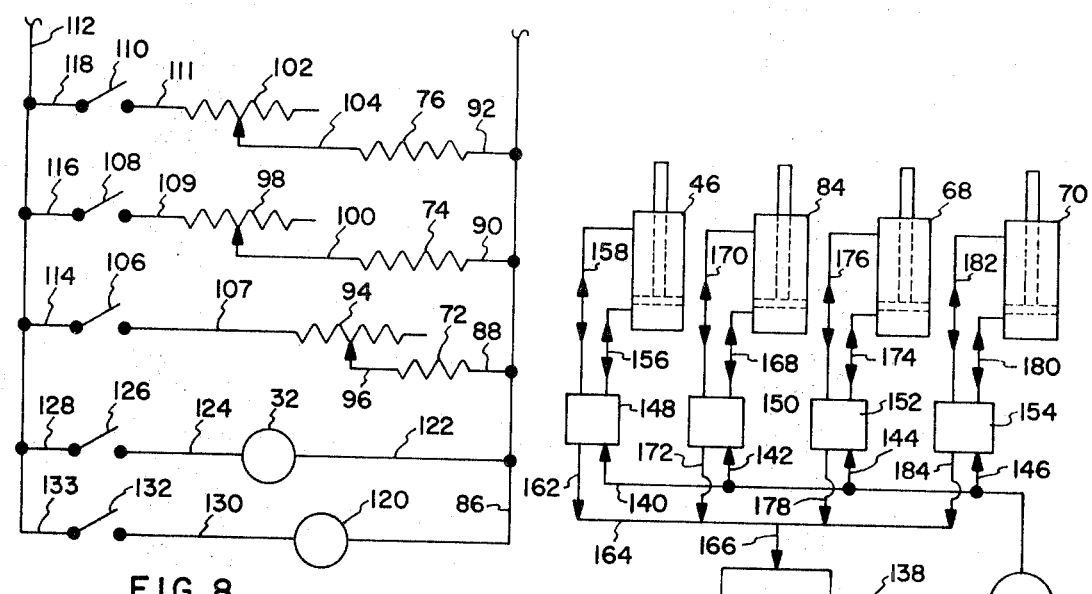
FIG. 8 is a schematic electrical circuit diagram of one type of circuit that can be used to activate the heaters of the molding apparatus of this invention.
FIG. 9 is a schematic flow diagram of the control mechanism for positioning the platen, pressure bars and heaters of the molding apparatus of this invention.

Heaters 72, 74, and 76 are preferably conventional electrical resistance-type heaters regulated with individual power control means. An electrical circuit diagram for one type of circuit that can be used for powering the heaters is illustrated in FIG. 8. As shown, resistant heaters 72, 74, and 76 are electrically connected to power supply line 86 with conductors 88, 90 and 92 respectively. For control purposes, heater 72 is connected to potentiometer 94 with line 96, heater 74 is connected to potentiometer 98 with line 100, and heater 76 is connected to potentiometer 102 with line 104. Potentiometer 94 is in turn connected to switch 106 with line 107 while potentiometer 98 is connected to switch 108 with line 109, and potentiometer 102 is connected to switch 110 with line 111. The aforementioned switches are connected to return 112 with conductors 114, 116, and 118. Motor 32 which rotates screw member 24 is connected to power supply line 86 with conductor 122 and pump motor 120, hereinafter described, is connected directly to power supply line 86. These motors are activated with control switches, i.e., motor 32 is connected with line 124 to switch 26 which in turn is connected with conductor 128 to return 112 and pump motor 120 is connected with line 130 to switch 132 which is connected with conductor 133 to return 112.

As indicated, heaters 74 and 76 are raised and lowered with double-acting pistons 84, platen bars 42 are raised and lowered with double-acting pistons 46, pressure bar 48 is moved in guide slots 60 with double-acting pistons 68, and pressure bar 50 is moved in guide slots 64 with double-acting pistons 70. Each of the aforementioned pistons are activated with fluid pumped from reservoir 136 through line 138 to pump 134. The pump can be a conventional hydraulic one driven with motor 120. From pump 134 pressurized fluid flows through lines 140, 142, 144, and 146 to four-way valves 148, 150, 152, and 154 respectively. From valve 148 the pressurized fluid flows into the cylinder of piston 46 and then back to the valve 148 along either line 156 or line 158 depending on the setting of the valve, wherein piston 48 is moved inwardly or outwardly in its coacting cylinder. From valve 148 the pressurized fluid returns back to reservoir 136 through lines 162, 164, and 166. Pistons 68, 70, and 84, are activated in a fashion similar to piston 48. Lines 168 and 170 interconnect the cylinder of piston 84 with valve 150 which in turn is connected to reservoir 136 with lines 172, 164, and 166; the cylinder of piston 68 is connected to valve 152 with lines 174 and 176 and said valve 152 is connected to reservoir 136 with lines 178, 164, and 166; and the cylinder of piston 70 is connected to four-way valve 154 with lines 180 and 182 and said valve 164 is turn connected to reservoir 136 with lines 184, 164, and 166.

FIG. 4 illustrates one type of counter top blank that can be formed in a single molding operation with the fabricating device of this invention into a counter top having a bull nosed front edge 186, a back splash board 188, and a rounded edge 190 of the type illustrated in FIG. 5. The blank generally comprises a substantially plane support member 22 such as a sheet of plywood, or the like, having a bullnosed front end piece 186 securely connected to one side of member 22. A splash board support section 188, similar in construction to member 22, is positioned along the side edge of the member 22 opposite from the bullnosed end piece 186 and the two support members 22 and 188 are connected together with an overlying laminated plastic sheet 52 bonded with a conventional adhesive material to the top face 23 of member 22 and the top face 189 of member 188. The laminated plastic sheet 52 is sized to extend outwardly over the side edges of bullnose member 186 and rounded top edge member 190 of the blank so that the sheet can be bent around these members and completely cover them. Examples of laminated plastics that can be fabricated with the apparatus of this invention are plastic sheets sold under the trade name "Formica," "Pionite" and "Texolite."

Figure 10:
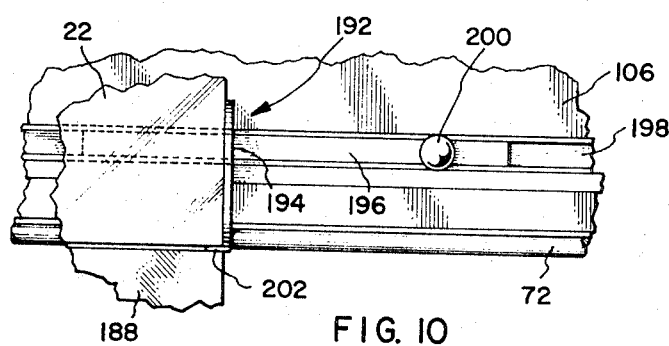
FIG. 10 is a partial top view of the bed of the molding apparatus of this invention particularly illustrating one type of positioning means for aligning a counter top blank on the bed.

In using the molding apparatus of this invention a counter top blank is formed as herein described and as illustrated in FIG. 4. The top face of laminated plastic sheet 52 is then placed on the top face 12 of bed 10 so that the line of intersection between blank members 22 and 188 is positioned proximate the side edge of the bed 10 next to forming die 20. This alignment may be insured through the use of an aligning device 192 of the type illustrated in FIGS. 7 and 10. As shown, the aligning device comprises a T-member having a substantially plane squaring face 194 attached to a guide 196 sized to ride in an elongated channel 198 which extends along the side edge of bed section 106. A handle 200 can be attached to the guide member for urging the member along channel 198 to coact with one end of the counter top blank. An outwardly extending spacer 202 is connected to one end of squaring face 194 at a position proximate the side edge of bed section 10$b$ for insertion between counter top blank section 22 and section 188 to thereby hold the sections in a fixed position on the bed's top face 12. Aligning means of the type described can, of course, be positioned on opposite sides of the counter top blank and this is preferred.

As herein indicated, bed 10 can be adjusted to accomodate different sized counter top blanks. Once the line of intersection between blank sections 22 and 188 is aligned with the forming die side edge of the bed, bed section 10$a$ can then be adjusted so that its outside edge 204 is proximate the line of intersection between bullnose front edge section 186 and blank member 22 as illustrated in FIG. 3. When thus positioned, the molding device's platen is lowered until bars 44 are urged against the counter top blank to hold the blank in a fixed position on the bed. Side heaters 74 and 76 are then moved to a position substantially adjacent to the portions of plastic sheet 52 which extend over the side edges of bed 10 whereupon the side heaters and rod heater 72 are activated by closing switches 106, 108, and 110. Plastic sheet 52 is then heated until it reaches its softening temperature. There are suitable inks such as those sold under the name "Tempilaq" which melt at a particular designated temperature. Accordingly, by smearing a small amount of such an ink on the portion of the laminated plastic being heated the heating time can be controlled. For example, when "Formica" laminated plastic is used a 315° F. ink will be used; for the laminated plastic "Pionite," a 300° F. ink will be employed, and for the laminate "Texolite" a 315° F. ink is needed.

When the temperature indicating ink begins to melt side heaters 74 and 76 are lowered away from the plastic sheet 52 with pistons 84 and hydraulic pistons 68 and 70 are activated to move pressure bars 48 and 50 into contact with the counter top blank. As illustrated in FIG. 6, pressure bar 48 is moved along guide 60 from a beginning position shown in phantom to a position against laminated plastic sheet 52. When the pressure bar 48 contacts the laminated plastic it begins to rotate on shaft 58 and roll over the surface of bullnosed front end member 186 to press sheet 52 against the bullnosed member whereupon it is bonded to the member with an adhesive material previously spread over the member. Pressure bar 50 is simultaneously moved from its beginning position, also shown in phantom, to a position in contact with splash board blank member 188 as illustrated in FIG. 7. When pressure bar 50 moves into contact with the splash board member 188 plastic sheet 52 is sharply bent between the blank members 22 and 188 along the rod heater 72 and the plastic material extending beyond curved end member 190 is urged into contact with die 20 to bend plastic sheet 52 against the curved end member 190.

When the counter top has been formed as herein-described platen bars 42 are raised away from the blank so that it can be removed away from bed 10. A filler strip 204 is then fitted between blank members 22 and 188 to hold back splash wall 188 in a fixed position with respect to the counter surface 22.

If the plastic sheet 52 extends over the edge of bullnose number 186 or curved member 190 the excess plastic can be cut to conform with the edges of said members.

It is to be noted that the die member 20 as referred to herein includes a first substantially plane portion which coacts with the black splash portion 188 of the counter top and a curved portion for shaping the laminated plastic sheet 52 against the curved member 190 of the counter top blank.

I claim:

1. Apparatus, for forming a countertop from a countertop underlayment blank and a splash board underlayment blank bonded in a substantially side-by-side relationship to one face of a sheet of moldable material, which comprises: a support frame; bed means attached to said support frame having first and second side edges for supporting the sheet of moldable material thereon such that the proximate line of intersection between the countertop underlayment blank and the splash board underlayment blank is positioned substantially along the first side edge of the said bed means; platen means attached to said frame for holding the portion of said sheet of moldable material bonded to said countertop underlayment blank in a relatively fixed position against said bed means; first heater means secured to said bed frame and mounted on the first side edge of said bed means and positioned to heat said sheet of moldable material along the line of intersection between the countertop underlayment blank and the splash board underlayment blank; and pressure means attached to said support frame to coact with said splash board underlayment blank and bend said sheet of moldable material over said first side edge of said bed means and hold said splash board underlayment blank in a fixed position.

2. The apparatus of claim 1 wherein second heater means are secured to said support frame for heating the portion of said sheet of moldable material which extends outwardly away from the outside edge of said splash board underlayment blank, and die means are affixed to said support frame proximate to and along said first side edge of said bed means for shaping said sheet of moldable material extending outwardly away from said outside edge of said splash board underlayment blank against said outside edge of said splashboard underlayment blank when said portion of said sheet material is urged against said die means.

3. The apparatus of claim 2 wherein a portion of said sheet of moldable material extends outwardly away from the outside edge of the countertop underlayment blank proximate said second side edge of said bed means and third heating means are attached to said support frame for heating the portion of said moldable material extending outwardly away from said outside edge of said countertop underlayment blank.

4. The apparatus of claim 3 wherein second pressure means are attached to said support frame for urging the portion of sheet material extending outwardly away from said outside edge of said countertop underlayment blank against said outside edge of said countertop underlayment blank.

5. The combination of claim 4 wherein said second and said third heating means are mounted on repositioning means for moving said second means adjacent to and away from said moldable material extending outwardly away from said first side edge of said bed and for moving said third heating means adjacent to and away from said moldable material extending outwardly away from said second side edge of said bed means.

6. The combination of claim 5 wherein said first and said second pressure means are substantial square elongated members rotatably mounted at their opposite ends in guide means for directing the movement of said pressure means along a predetermined path.

7. The combination of claim 6 wherein said first and said second pressure means are covered on their sides with a resilient material.

8. The combination of claim 7 wherein said bed means is adjustable to accommodate different-sized supporting members.